US007415048B2

(12) United States Patent
Wu (10) Patent No.: US 7,415,048 B2
(45) Date of Patent: Aug. 19, 2008

(54) DIFFERENTIAL DELAY COMPENSATION

(75) Inventor: Zhao Wu, San Jose, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 1076 days.

(21) Appl. No.: 10/232,961

(22) Filed: Aug. 30, 2002

(65) Prior Publication Data

US 2003/0095563 A1 May 22, 2003

Related U.S. Application Data (60) Provisional application No. 60/316,375, filed on Aug. 30, 2001.

(51) Int. Cl.
*H04J 3/16* (2006.01)
(52) U.S. Cl. .................. 370/542; 370/509; 370/536
(58) Field of Classification Search ............ 370/464, 370/538, 539, 393–394, 541, 542, 543, 535–537, 370/508–510, 467; 709/231; 710/57; 398/43
See application file for complete search history.

(56) References Cited

U.S. PATENT DOCUMENTS

| 4,625,308 | A  | * | 11/1986 | Kim et al. ............. 370/321 |
| 4,769,790 | A  | * | 9/1988  | Yamashita ............ 365/189.12 |
| 5,033,044 | A  | * | 7/1991  | Williams et al. ......... 370/510 |
| 5,461,622 | A  | * | 10/1995 | Bleickardt et al. ....... 370/470 |
| 6,449,292 | B1 | * | 9/2002  | Weeber ................ 370/517 |
| 6,594,329 | B1 | * | 7/2003  | Susnow ................ 375/372 |
| 6,667,989 | B1 | * | 12/2003 | Sekii et al. ............. 370/465 |
| 6,731,656 | B1 | * | 5/2004  | Slater et al. ............ 370/536 |
| 6,842,787 | B2 | * | 1/2005  | Stadler et al. .......... 709/231 |
| 6,917,630 | B1 | * | 7/2005  | Russell et al. .......... 370/532 |
| 6,999,470 | B2 | * | 2/2006  | Murton et al. .......... 370/466 |
| 7,298,744 | B1 | * | 11/2007 | Suh et al. ............. 370/393 |
| 2002/0141456 | A1 | * | 10/2002 | Wang et al. ........... 370/539 |
| 2003/0007519 | A1 | * | 1/2003  | Murton et al. .......... 370/539 |
| 2006/0215553 | A1 | * | 9/2006  | Saitoh ................. 370/229 |

OTHER PUBLICATIONS

Gorshe, Steven, Contribution to T1 Standards Project "Revised Draft T105 SONET Base Standard", Oct. 20, 2000.*
Jyh-shiam Yur, Barbara G. Ryder, William A. Landi, "An Incremental Flow- and Context-sensitive Pointer Aliasing Analysis", IEEE, 1999.*

* cited by examiner

*Primary Examiner*—Aung S. Moe
*Assistant Examiner*—Habte Mered
(74) *Attorney, Agent, or Firm*—Townsend and Townsend and Crew LLP (57) ABSTRACT

An alignment logic together with an MFI extractor are adapted to compensate for differential delays. The MFI extractor extracts the MFI disposed in the path overhead of each constituent time-slot. The alignment logic uses the extracted MFI to align corresponding data words (i.e., data words that are transmitted during the same time period) at the receiving end of virtually concatenated channels and that occupy different time-slots of the same channel. To perform alignment, the alignment logic stores each data word in a RAM location that is defined by an associated MFI. The data words so stored are aligned when read sequentially from their stored locations. The synchronization logic in the alignment logic synchronizes all the constituent time-slots.

30 Claims, 4 Drawing Sheets

| STATE | PART MFI | FULL MFI |
|---|---|---|
| INVALID MFI | 0 | 0 |
| PARTIAL MFI AVAILABLE | 1 | 0 |
| FULL MFI AVAILABLE | 1 | 1 |

DIFFERENTIAL DELAY COMPENSATION

CROSS-REFERENCES TO RELATED APPLICATIONS

The present application claims priority from the U.S. provisional patent application, Ser. No. 60/316,375, filed Aug. 30, 2001 and entitled "RECEIVE VIRTUAL CONCATENATION PROCESSOR", the content of which is herein incorporated by reference in its entirety.

The present application is also related to the following U.S. patent applications, the contents of each of which is herein incorporated by reference in its entirety:

U.S. patent application Ser. No. 09/943,386, filed Aug. 30, 2001, and entitled "TRANSMIT VIRTUAL CONCATENATION PROCESSOR", U.S. patent application Ser. No. 10/126,466, filed Apr. 19, 2002, and entitled "DATA STREAM PERMUTATION APPLICABLE TO LARGE DIMENSIONS".

The present application is also related to application Ser. No. 10/232,962, entitled "RECEIVE VIRTUAL CONCATENATION PROCESSOR", filed contemporaneously herewith, and application Ser. No. 10/233,306, entitled "DATA FORMAT CONVERSION FOR VIRTUAL CONCATENATION PROCESSING", filed contemporaneously herewith, both assigned to the same assignee, and both incorporated herein by reference in their entirety.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to communications network, and more particularly to concatenation of channels in a communications network.

Demand for high performance communication networks capable of transporting multiple types of data, such as text, audio and video data, is on the rise. To carry greater amount of data over existing communication channels, such as fiber-optic communication channels, network carriers are increasingly using high bandwidth technologies, such as wave division multiplexing (WDM) and optical carrier (OC) level 48. Such communication networks rely upon high-performance packet switches, such as asynchronous transfer mode (ATM) switches, frame relay switches and internet protocol (IP) routers which route the incoming packets to their desired destinations.

A commonly known standard referred to as synchronous optical network (SONET) defines a synchronous frame structure for transmitting signals using time division multiplexing. The basic building block of a SONET frame, commonly referred to as synchronous transport signal-1 (STS-1) includes 810 bytes that are transmitted every 125 μsec. Therefore a SONET channel carrying STS-1 frames (i.e., an STS-1 pipe) has a bit rate of 51.84 Mb/s, which has a corresponding optical signal referred to as OC-1.

Many STS-1 pipes may be contiguously concatenated to achieve higher bandwidths. For example, three STS-1 pipes may be contiguously concatenated to transmit three STS-1 frames, thus to achieve a bit rate of 155.52 Mb/s. In the following, the designation –Nc (N is an integer) appended to STS indicates the number of STS-1 pipes that are contiguously concatenated. For example, STS-3c indicates contiguous concatenation of three STS-1 pipes. In a similar manner, STS-12c indicates contiguous concatenation of twelve STS-1 pipes.

STS-1 or STS-Nc frames transported over contiguously concatenated pipes travel as a single unit with the granularity of the larger concatenated pipes. For example, in a STS-12c traffic—which signifies concatenation of 12 STS-1 pipes—adding or dropping of data by add/drop multiplexers are carried out at 12c granularity. The higher granularity simplifies such tasks as error control, performance control and error monitoring of the contiguously concatenated data. Many smaller pipes may be concatenated to form a larger pipe. For example, to form a STS-12c pipe, either twelve STS-1 or four STS-3c may be concatenated. In contiguous concatenation, data carried in time-slots associated with the smaller pipes travel through the same paths and thus have substantially similar propagation delays. For example, all STS-1 frames of a contiguously concatenated STS-12c travel through the same path.

The number of pipes that may be contiguously concatenated is typically limited to integer multiples of four STS-3c pipes, e.g. STS-12c, STS-48c, STS-192c, etc. Consequently, if a user desires to transmit data at, e.g., five times the bandwidth of an STS-1 pipe (i.e., at STS-5c), the user is required to use a STS-12c pipe or higher. This results in inefficient and wasteful use of bandwidth and thus increases cost. Furthermore, many of networking devices currently deployed, such as add/drop multiplexers, only operate at the STS-1 or STS-3c levels. Therefore, even if, for example, STS-12c is allowed by the standards, because associated frames of such a pipe travel together as a bundle, every networking device disposed between the transmitting and the receiving end of such a pipe is required to process these frames at the 12-c level. Therefore, to the extent that many of the currently deployed networking devices are adapted to operate at STS-1 or STS-3c levels only, they are unable to handle STS-12c data frames, thus rendering such concatenated pipes ineffective.

To more efficiently utilize the SONET/SDH bandwidth, virtual concatenation has been developed. Virtual concatenation is defined, in part, by the ANSI T1-X1.5, which is an evolving standard. In accordance with the virtual concatenation, any number of smaller STS-1 or STS-3c pipes may be grouped together to form a larger pipe. For example, three STS-1 pipes may be virtually concatenated to form a STS-1-3v pipe. In the following, it is understood that –Nv (N is an integer) appended to either STS-1 or STS-3c designates the number of respective channels that are virtually concatenated. For example, STS-1-12v designates virtual concatenation of twelve STS-1 pipes. Similarly, STS-3c-16v designates virtual concatenation of sixteen STS-3c pipes.

In virtual concatenation, data carried in time-slots associated with the smaller pipes may travel through different paths with different propagation delays. Synchronization is maintained between the transmitting end and the receiving end such that the virtually concatenated channels appear as contiguously concatenated channels. Because virtual concatenation enables concatenation of any number of smaller pipes, it overcomes some of the above described problems associated with contiguously concatenated pipes. For example, virtual concatenation enables forming a STS-1-5v pipe which, as described above, does not have a contiguously concatenated counterpart pipe, i.e., there is no STS-5c pipe. Moreover, because in virtual concatenation, the basic building blocks STS-1 or STS-3c, i.e., the frames with the lowest granularity, are not bundled together, they are readily supported by currently deployed networking devices.

Figure 1:
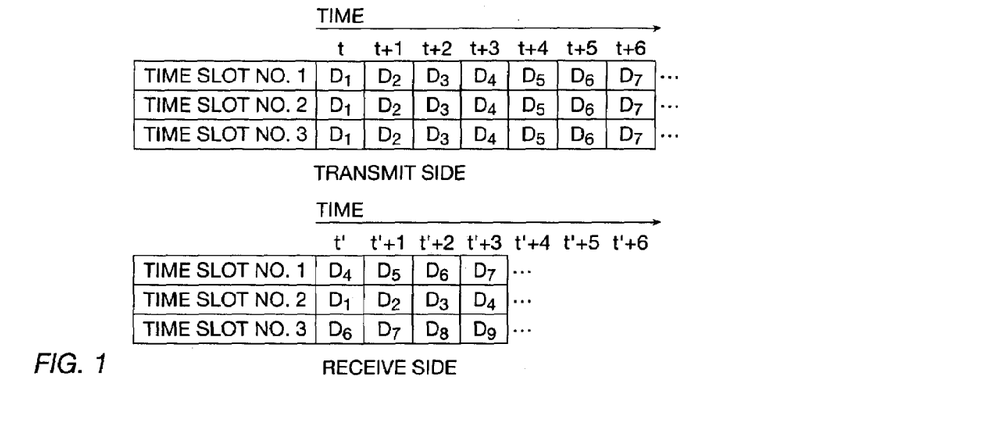
FIG. 1 shows data bytes associated with three time-slots as they are transmitted and received across a virtually concatenated channel.

Data bytes transmitted through virtually concatenated channels are originally aligned across their constituent time-slots. However, data belonging to different time-slots may be transmitted through different paths with different delays. Therefore, data bytes are typically not aligned when received by a receiver. FIG. 1 shows data bytes associated with three time-slots 1, 2 and 3 as transmitted and received across one channel. As seen from FIG. 1, data bytes $D_1$, $D_2$, $D_3$, $D_4$, $D_5$, $D_6$, $D_7$ ... of each of time-slots 1, 2 and 3 are aligned when transmitted at the transmitter end. However, due to differential delays, while time-slot 1 receives data bytes $D_4$, $D_5$, $D_6$ and $D_7$, ... time-slot 2 receives data bytes $D_1$, $D_2$, $D_3$ and $D_4$, and time-slot 3 receives data bytes $D_6$, $D_7$, $D_8$ and $D_9$. Note that, for example, data byte $D_1$ of time-slot 2 is aligned with data byte $D_4$ of time-slot 1 and data byte $D_6$ of time-slot 3. Therefore, as seen from FIG. 1, the data bytes associated with time-slots 1, 2 and 3 are not aligned when received by a receiver.

BRIEF SUMMARY OF THE INVENTION

An alignment logic aligns corresponding data words (i.e., data words that are transmitted during the same time period) at the receiving end of virtually concatenated channels for all constituent time-slots of the same channel. To perform alignment, the alignment logic is adapted to include a random access memory (RAM) which stores the constituent time-slots therein. The alignment is carried out while the constituent time-slots are written into the RAM by adjusting the RAM write pointer. Accordingly, no adjustment of the RAM read pointer is required and the constituent time-slots as read from the RAM are aligned.

To adjust the RAM write pointer, the multi-frame indicator and sequence number disposed in the H4 byte of the incoming frames are extracted. The H4 byte is disposed in the path overhead bytes of the SONET/SDH frame. It may take up to 16 frames to accumulate the multi-frame indicator (MFI) and sequence number (SQ) for each time-slot. If the MFIs for the received time-slots are not in sequence or if the sequence number for a time-slot is not the same as a programmed (i.e., expected) sequence number, an error flag is set.

The extracted MFI together with a number of other signals are used to calculate the write pointer of the RAM associated with the alignment logic during every cycle when the alignment logic receives valid data.

The alignment logic and the MFI/SQ extractor may be embedded in a receive virtual concatenation processor (RVCP) adapted to convert time-interleaved bytes of SONET/SDH frames to per channel data defined by a channel mapping and an associated programmable calendar. The time-slot interleaved input may be generated from a number of different channels and carried via SONET frames of various sizes such as STS-12, STS-48, STS-192, STS-768.

The alignment logic is adapted to receive and align per time-slot data from a matrix transposer that is also disposed in the RVCP. The matrix transposer, in combination with an input buffer that is also disposed in the RVCP, generates per time-slot data from time-slot interleaved data.

DETAILED DESCRIPTION OF THE INVENTION

In accordance with one embodiment of the present invention, an alignment logic aligns corresponding data words (i.e., data words that are transmitted during the same time period) at the receiving end of virtually concatenated channels for all constituent time-slots of the same channel. For simplicity, in the following such data words are alternatively referred to either as data words occupying constituent time-slots or as constituent time-slots. To perform alignment, the alignment logic is adapted to include a random access memory (RAM) which stores the constituent time-slots therein. The alignment is carried out while the constituent time-slots are written into the RAM by adjusting the RAM write pointer. Accordingly, no adjustment of the RAM read pointer is required and the constituent time-slots as read from the RAM are aligned.

To adjust the RAM write pointer, the multi-frame indicator and sequence number disposed in the H4 byte of the incoming frames are extracted. The H4 byte is disposed in the path overhead bytes of the SONET/SDH frame. It may take up to 16 frames to accumulate the multi-frame indicator (MFI) and sequence number (SQ) for each time-slot. If the MFIs for the received time-slots are not in sequence or if the sequence number for a time-slot is not the same as a programmed (i.e., expected) sequence number, an error flag is set.

The extracted MFI together with a number of other signals are used to calculate the write pointer of the RAM associated with the alignment logic during every cycle when the alignment logic receives valid data.

The alignment logic and the MFI/SQ extractor may be embedded in a receive virtual concatenation processor (RVCP) adapted to convert time-slot interleaved bytes of SONET/SDH frames to per channel data defined by a channel mapping and an associated programmable calendar. The time-slot interleaved input may be generated from a number of different channels and carried via SONET frames of various sizes such as STS-12, STS-48, STS-192, STS-768.

The alignment logic is adapted to receive and align per time-slot data from a matrix transposer that is also disposed in the RVCP. The matrix transposer, in combination with an input buffer that is also disposed in the RVCP, generates per time-slot data from time-slot interleaved data.

Figure 2:
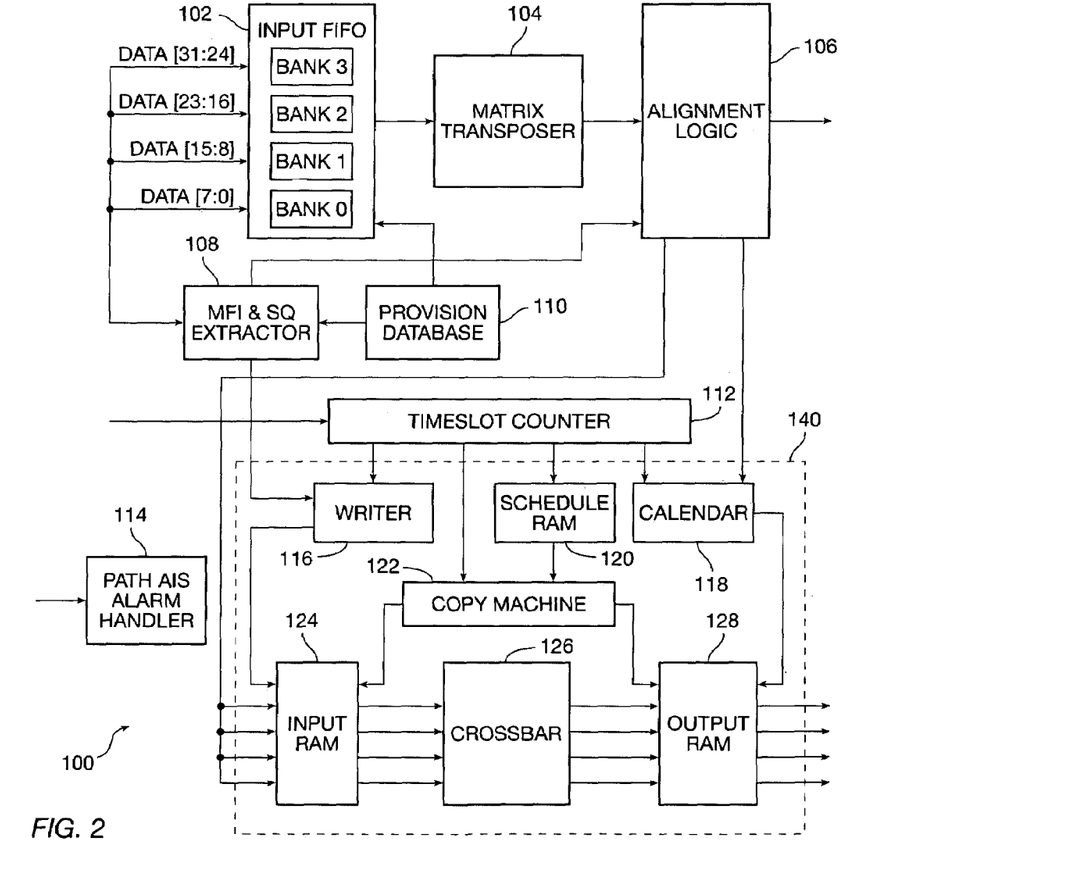
FIG. 2 is a simplified block diagram of various logic blocks disposed in the receive virtual concatenation processor, in accordance with one embodiment of the present invention.

FIG. 2 is a simplified block diagram of an exemplary RVCP 100 adapted to convert time-slot interleaved data that it receives to per time-slot data and subsequently to convert the per time-slot data to per-channel data. RVCP 100 includes, in part, an input buffer 102, a matrix transposer 104, an alignment logic 106, a multi-frame indicator and (MFI&SQ) 108, a provision database 110, a time-slot counter 112, a path AIS alarm handler 114, a writer 116, a calendar 118, a schedule ram 120, a copy machine 122, an input RAM 124, a cross bar 126 and an output RAM 128.

Writer 116, calendar 118, schedule ram 120, copy machine 122, input RAM 124, cross bar 126 and output RAM 128 collectively form marriage network 140 which is described in U.S. patent application Ser. No. 10/126,466, filed Apr. 19, 2002, and entitled "DATA STREAM PERMUTATION APPLICABLE TO LARGE DIMENSIONS", the content of which is incorporated herein by reference in its entirety. The input buffer, the matrix transposer and various other blocks of RVCP 100 are described in application Ser. No. 10/232,962, "RECEIVE VIRTUAL CONCATENATION PROCESSOR", and application Ser. No. 10/233,306, "DATA FORMAT CONVERSION FOR VIRTUAL CONCATENATION PROCESSING", both of which are incorporated herein by reference in their entirety. The MFI&SQ indicator 108 and alignment logic 106 are described below.

MFI and SO Extractor

Multi frame indicator (MFI) and sequence number (SQ) extractor 108 (collectively referred to hereinbelow as extractor 108) parses the H4 byte in the path overhead to extract the MFI and the SQ for each time-slot.

The delay information of each time-slot in a SONET/SDH frame is encoded in the H4 byte of the path overhead. Table I below shows the sequence number and multi-frame indicator encoding of the H4 byte of the path overhead, as is known to those skilled in the art. As seen from Table I, the H4 byte carries the sequence number, the multi-frame indicator, and some reserved fields. Since these fields are encoded in the H4 byte in a serial format, it takes up to 16 frames for each time-slot to form the sequence number—which has 8 bits—and the multi-frame indicator—which has 12 bits.

TABLE I

| Bits 7-4 | Bits 3-0 (MFI[3:0]) | Multi-frame indicator (MFI) |
| --- | --- | --- |
| SQ[7:4] | 1110 | n − 2 |
| SQ[3:0] | 1111 | n − 1 |
| MFI[11:8] | 0000 | n |
| MFI[7:4] | 0001 | n + 1 |
| Reserved (0000) | 0010 | n + 2 |
| Reserved (0000) | 0011 | n + 3 |
| Reserved (0000) | 0100 | n + 4 |
| Reserved (0000) | 0101 | n + 5 |
| Reserved (0000) | 0110 | n + 6 |
| Reserved (0000) | 0111 | n + 7 |
| Reserved (0000) | 1000 | n + 8 |
| Reserved (0000) | 1001 | n + 9 |
| Reserved (0000) | 1010 | n + 10 |
| Reserved (0000) | 1011 | n + 11 |
| Reserved (0000) | 1100 | n + 12 |
| Reserved (0000) | 1101 | n + 13 |
| SQ[7:4] | 1110 | n + 14 |
| SQ[3:0] | 1111 | n + 15 |
| MFI[11:8] | 0000 | n + 16 |
| MFI[7:4] | 0001 | n + 17 |
| Reserved (0000) | 0010 | n + 18 |

Because the data sent out via virtually concatenated channels are originally aligned, the same MFI is generated for all the constituent time-slots. However, when the MFIs for constituent time-slots are received, they may no longer be aligned because time-slots may be routed independent of one another. Moreover, the cycle during which each time-slot receives an associated H4 byte may not be the same. FIG. 1 shows exemplary data bytes associated with three time-slots 1, 2 and 3 as transmitted and received across a virtually concatenated channel. Assume that $D_1$ in FIG. 1 represents the H4 byte, then the three $D_1$'s on the transmitting side all have the same MFI. However, on the receiving side at time t', the H4 byte $D_1$ of time-slot 2 is aligned with data bytes $D_4$ of time-slot 1 and data byte $D_6$ of time-slot 3. To realign the three constituent time-slots, extractor 108 finds the MFIs for all the constituent time-slots and passes them to the alignment logic 106 for alignment.

Figure 3:
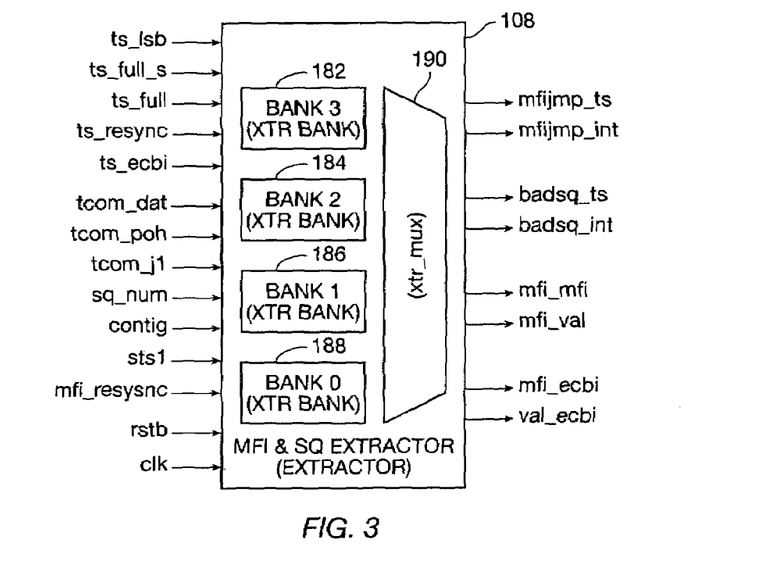
FIG. 3 is a simplified block diagram of the multi frame indicator and sequence number extractor disposed in the receive virtual concatenation processor of FIG. 2, in accordance with one embodiment of the present invention.

FIG. 3 shows a block diagram of an exemplary embodiment of extractor 108. Extractor 108 accumulates and outputs the 12-bit MFI via output signal MFI_MFI. Signal MFI_VAL indicates whether signal MFI_MFI is valid. Extractor 108 also verifies that the MFI for each incoming time-slot is sequential and that the SQ of that time-slot matches a preprogrammed value. Signal MFIJMP_INT indicates an MFI jump. Signal MFIJMP_TS indicates the time-slot in which the jump happened. Signal BADSQ_INT indicates whether sequence number SQ is wrong. Signal BADSQ_TS indicates the time-slot in which the wrong sequence number is found.

In every cycle, extractor 108 may receive up to four H4 bytes (since there are four banks) and outputs one MFI per cycle. Because after a channel is provisioned, its sequence numbers remain fixed, extractor 108 does not supply the SQ that it receives.

Figure 4A:
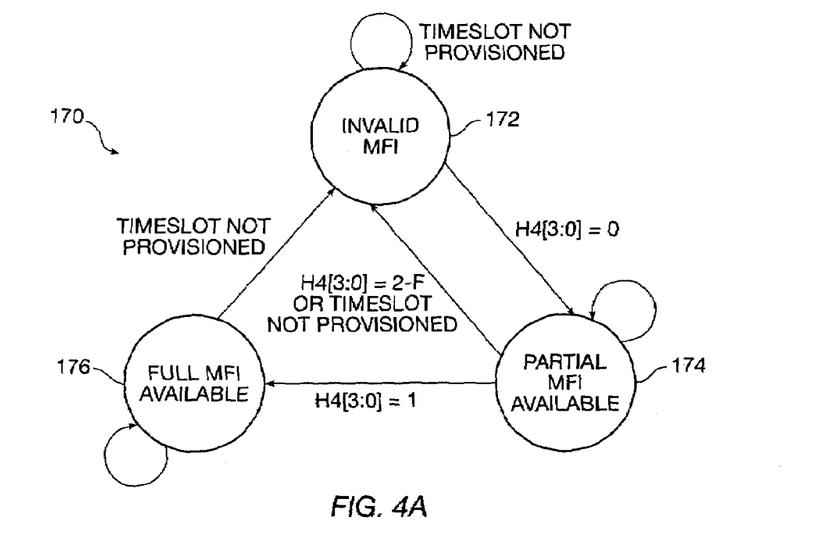
FIGS. 4A and 4B respectively show state diagram and state table associated with a state machine disposed in the multi frame indicator and sequence number extractor of FIG. 3.
Figure 4B:
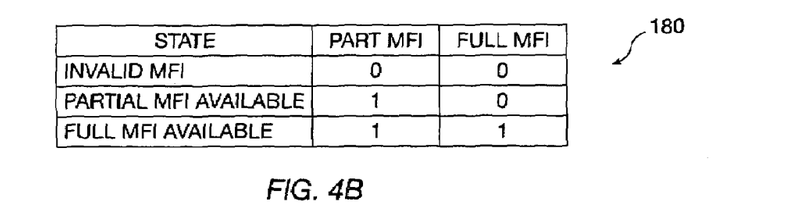

Because it takes up to 16 frames to accumulate the MFI, extractor 108 maintains one accumulator for each time-slot to gather the MFI for that time-slot. Extractor 108 includes a state machine that keeps track of the bit accumulation for each MFI. FIGS. 4A and 4B respectively show the state diagram 170 and state table 180 associated with the state machine disposed in extractor 108. As seen from state diagram 170, if a time-slot in not provisioned or is used for contiguous concatenation—in which case there is no H4 byte—state machine 170 stays in the invalid MFI state 172 and outputs an MFI invalid signal. If a time-slot is associated with a provisioned virtual concatenation, state machine 170 transitions to state partial MFI available 174 after receiving the four bits of MFI[11:8]. A frame later, after receiving the four bits of MFI[7:4], state machine 170 transitions to state full MFI available 176 and outputs the entire accumulated bits of the MFI and asserts signal MFI_VAL to indicate that the accumulated MFI is valid until the time-slot is unprovisioned. Table 180 of FIG. 4B shows the state encoding associated with state machine 170.

In order to identify the H4 byte in a frame, a row counter is used for each time-slot. To count the 9 rows of a frame, four bits are required. However, in accordance with one aspect of the present invention, because the H4 byte is in the $6^{th}$ row of a frame, the counter only needs to count from 0 to 5 and thus the row counter of the present invention uses only three bits. Signal TCOM_J1 is used to reset the counter, and signal TCOM_POH is used to increment the row counter.

As defined in the ANSI SONET/SDH standard, an STS-1 or STS-3c SPE starts from the J1 byte and the MFI is not available until the H4 byte arrives. Accordingly, extractor 108 pre-increments the MFI and outputs the MFI when matrix transposer 104 outputs the start-of-frame signal MT_SOF, which occurs before it receives the next H4 byte. Signal MT_SOF is received from matrix transposer 104 when the first word of a frame is available. The pre-incremented MFI value is matched against the next H4 byte; signal MFIJMP_INT is asserted if there is any mismatch between the two values.

The expected sequence numbers for the 48 time-slots are stored in a sequence RAM disposed in extractor 108 (not shown). Because 4 sequence numbers may arrive during every cycle and each sequence number is 6 bits wide to index 48 time-slots, the sequence RAM is adapted to include 4×6=24 rows (i.e., entries). The sequence RAM is further adapted to include two pages, each having 24 rows; each page is selected by the least significant bit (LSB) of the address. Because the sequence RAM includes two pages, it supports hitless provisioning change. In other words, a received sequence number may be matched against its expected value while a new provision is being programmed.

Extractor 108 also includes a virtual channel number RAM (not shown), which is organized as an array of 96 rows and 6 columns, i.e., each row is adapted to store 6 bits. The virtual channel number RAM includes two pages to support hitless channel reprovisioning; each page is selected by the LSB of the address. The virtual channel number RAM indicates the channel to which each time-slot belongs. Because each row of virtual channel number RAM includes 6 bits, extractor 108 is adapted to support up to 48 virtual channels.

A shown in FIG. 3, extractor 108 includes four banks, namely banks 182, 184, 186 and 188 each associated with 12 time-slots of the exemplary STS-48 traffic. The data supplied by these four banks are multiplexed by multiplexer 190. As described above, although extractor 108 is adapted to receive up to four MFIs during any one cycle, it only outputs one MFI via signal MFI_MFI in any one cycle. Signal MFI_MFI is synchronized with the time-slot that is output by time-slot counter 112. Alignment logic 106 (see FIG. 2) uses signal MFI_MFI that is output by extractor 108 and its own frame pointer signals to identify the location of the 32-bit word that is supplied by matrix transposer 104 and stores it in the associated RAM, as described further below.

Table II designates respective numbers, bandwidths, and associated STS-1 and STS-3c time-slots of five virtually concatenated channels (namely channels 0-4) carried via STS-48, in accordance with one exemplary embodiment of the present invention.

Table III below shows the time-slots (i.e., TS) and corresponding sequence numbers (i.e., SQ) stored in each of the four banks of the sequence RAM. As seen from Table II, the three STS-1 time-slots assigned for each STS-3c time-slot are not consecutive. Only the first of each three STS-1 time-slots in an STS-3c time-slot includes path overhead, hence the sequence numbers for the other two STS-1 time-slots are not used (indicated by 63 in Table III). For example, STS-3c time-slot 5 occupies STS-1 time-slots 5, 21 and 37. Time-slot 5 has an expected SQ number of 1 and belongs to virtual channel 0, because time-slot 5 is the second constituent time-slot of channel 0. Time-slots 21 and 37 represent the two STS-1 time-slots which are concatenated with time-slot 5 to form the STS-3c. These two time-slots are not used and, accordingly, each is shown as having a sequence number of 63.

TABLE III

| | Bank 3 | | Bank 2 | | Bank 1 | | Bank 0 | |
|---|---|---|---|---|---|---|---|---|
| Entry | TS | SQ | TS | SQ | TS | SQ | TS | SQ |
| 0 | 0 | 0 | 1 | 0 | 2 | 2 | 3 | 1 |
| 1 | 4 | 4 | 5 | 1 | 6 | 5 | 7 | 3 |
| 2 | 8 | 0 | 9 | 0 | 10 | 2 | 11 | 3 |
| 3 | 12 | 1 | 13 | 2 | 14 | 1 | 15 | 0 |
| 4 | 16 | 63 | 17 | 63 | 18 | 63 | 19 | 63 |
| 5 | 20 | 63 | 21 | 63 | 22 | 63 | 23 | 63 |
| 6 | 24 | 63 | 25 | 63 | 26 | 63 | 27 | 63 |
| 7 | 28 | 63 | 29 | 63 | 30 | 63 | 31 | 63 |
| 8 | 32 | 63 | 33 | 63 | 34 | 63 | 35 | 63 |
| 9 | 36 | 63 | 37 | 63 | 38 | 63 | 39 | 63 |
| 10 | 40 | 63 | 41 | 63 | 42 | 63 | 43 | 63 |
| 11 | 44 | 63 | 45 | 63 | 46 | 63 | 47 | 63 |

Table IV below shows the corresponding values stored in the virtual channel number RAM. As seen from Table IV, each time-slot has an associated virtual channel number that is stored in the virtual channel number RAM.

TABLE IV

| Time-slot | 0 | 1 | 2 | 3 | 4 | 5 | 6 | 7 | 8 | 9 | 10 | 11 |
|---|---|---|---|---|---|---|---|---|---|---|---|---|
| VC | 0 | 3 | 0 | 3 | 3 | 0 | 3 | 0 | 1 | 2 | 3 | 4 |
| Time-slot | 12 | 13 | 14 | 15 | 16 | 17 | 18 | 19 | 20 | 21 | 22 | 23 |
| VC | 2 | 4 | 4 | 4 | 0 | 3 | 0 | 3 | 3 | 0 | 3 | 0 |
| Time-slot | 24 | 25 | 26 | 27 | 28 | 29 | 30 | 31 | 32 | 33 | 34 | 35 |
| VC | 1 | 2 | 3 | 3 | 2 | 4 | 4 | 4 | 0 | 3 | 0 | 3 |
| Time-slot | 36 | 37 | 38 | 39 | 40 | 41 | 42 | 43 | 44 | 45 | 46 | 47 |
| VC | 3 | 0 | 3 | 0 | 1 | 2 | 3 | 3 | 2 | 4 | 4 | 4 |

Note that although the above example is provided with reference to STS-48 and four banks are provided in extractor 108, the present invention may be scaled to support STS-N with W banks in the extractor 108.

TABLE II

| Channel | 0 | | | | 1 | 2 | | 3 | | | | | 4 | | |
|---|---|---|---|---|---|---|---|---|---|---|---|---|---|---|---|
| Bandwidth | STS-3c-4v | | | | STS-3c-1v | STS-3c-2v | | STS-3c-6v | | | | | STS-3c-3v | | |
| STS-3c time-slot | 0 | 5 | 2 | 7 | 8 | 9 | 12 | 1 | 3 | 10 | 11 | 4 | 6 | 15 | 14 | 13 |
| STS-1 time-slot | 0 | 5 | 2 | 7 | 8 | 9 | 12 | 1 | 3 | 10 | 11 | 4 | 6 | 15 | 14 | 13 |
| | 16 | 21 | 18 | 23 | 24 | 25 | 28 | 17 | 19 | 26 | 27 | 20 | 22 | 31 | 30 | 29 |
| | 32 | 37 | 34 | 39 | 40 | 41 | 44 | 33 | 35 | 42 | 43 | 36 | 38 | 47 | 46 | 45 |

Alignment Logic

Alignment logic 106 receives unaligned per time-slot W-byte data (i.e., data having differential delays), and in response, generates aligned data at its output terminals. Relatively smaller differential delays, e.g., delays corresponding to 0 to 3 bytes, are compensated by input buffer 102 when the bytes are packed to words. Therefore, data as they arrive at the input terminals of alignment logic 106 have been compensated for such relatively smaller differential delays. Alignment logic 106 compensates for relatively larger differential delays, i.e. delays greater than 3 bytes, via an internal or an external memory (alternatively collectively referred to hereinbelow as the memory).

In one exemplary embodiment, the internal memory disposed in alignment logic 106 is a RAM that is organized as arrays of queues each having a number of rows. Each queue is further adapted to receive and store W-byte words associated with a different one of the times-lots. Exemplary alignment logic 106 (see FIG. 5) is shown as having three queues each receiving data from a different one of STS-1 or STS-3c timeslots. When transmitted, data bytes are aligned across their three constituent time-slots (see FIG. 1). However, due to differential delays, they are typically not aligned when received by alignment logic 106. In the example shown in FIG. 5, data words $D_4$, $D_5$, $D_6$ and $D_7$ associated with timeslot 1 are received at a time when data words $D_1$, $D_2$, $D_3$ and $D_4$ associated with time-slot 2 and data words $D_6$, $D_7$, $D_8$ and $D_9$ associated with time-slot 3 are received by alignment logic 106. Note that, for example, data $D_1$ of time-slot 2 is aligned with data $D_4$ of time-slot 1 and data $D_6$ of time-slot 3. Therefore, assuming that, e.g., data $D_1$ of times-slot 2 is to be aligned with data $D_1$ of times-slot 1 and data $D_1$ of times-slot 3, etc., it is seen that the data associated with time-slots 1, 2 and 3 are not aligned when received at the input terminals of alignment logic 106.

Alignment logic 106 receives data for time-slots 1, 2 and 3 and, in response, generates aligned data for time-slots 1, 2 and 3. As seen from FIG. 5, data $D_1$ of time-slots 1, 2 and 3 output by alignment logic 106, are aligned. Similarly, data $D_2$, $D_3$ and $D_4$ of time-slots 1, 2 and 3 as output by alignment logic 106 are also aligned. The internal memory of alignment logic 106 is operative to compensate for approximately 125 μs delay between constituent time-slots. The storage capacity of the internal memory may be increased or decreased, however, to enable compensation for more or less than 125 μs of differential delay.

To increase the amount of propagation delay that the alignment logic is adapted to compensate for, some embodiments of the alignment are adapted to include an interface module operative to store data in and retrieve data from an external memory. The external memory enables the alignment logic to compensate, e.g., 50 msec of differential delay that may occur between constituent time-slots. In some embodiments, the external memory may be a quad data rate (QDR) static random access memory (SRAM). In yet other embodiments, the alignment logic's memory interface module is adapted to store data in and retrieve data from, e.g., double data rate (DDR) SRAMs or DRAMs or any other memory adapted to provide random access to, e.g., a word or a block of words stored therein.

Figure 5:
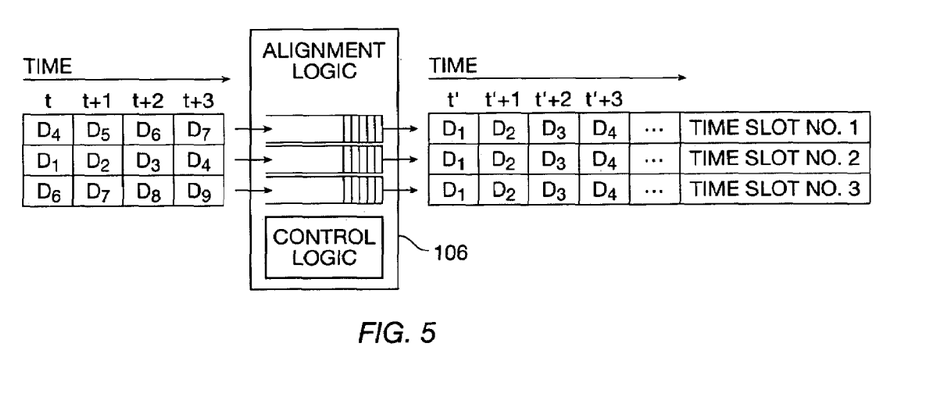
FIG. 5 shows data associated with three constituent time-slots of a virtually concatenated channel at input and output terminals of the alignment logic disposed in the receive virtual concatenation processor of FIG. 2.

Alignment logic 106 may be adapted to align the data it receives either at the write side (i.e., during writing of the data) or the read side (i.e., during reading of the data). In one embodiment, alignment logic 106 writes the data in the memory in such order that the written data are aligned when read from the memory. In other words, when alignment is done on the write side, data is written into addresses in such manner that when read out sequentially, they are aligned. As described above, by aligning the data on the write side, the constituent time-slots are aligned when the data is read. The following describes the manner in which the write pointer is adjusted to align the data during the write operation, so that the data as read from the alignment logic 106 without adjusting the read pointer are aligned. Aligning the data on the read side is obvious in view of the following.

Write Pointer Adjustment

The alignment logic maintains a data structure for each queue to keep track of relative positions of the read and write pointers for all the constituent timeslots of a channel. The per-time-slot data structure includes the following signals:

| | |
|---|---|
| INIT_PTR | is the base address of a queue in internal or external RAM and is programmed by user |
| MAX_MFI | is the queue size or maximum incoming and outgoing MFI difference and is programmed by user |
| MFI_IN | is the incoming MFI from the SONET/SDH (0-4095); is reset to 0 and is updated by alignment logic |
| MFI_IN_IDX | where MFI_IN is mapped in the queue (0 – MAX_MFI-1); is reset to 0 and is updated by the alignment logic |
| MFI_OUT_IDX | where MFI_OUT is mapped in the queue (0 – MAX_MFI-1); is reset to 0 and is updated by the alignment logic |
| SPE_SIZE | is the payload size in 32-bit words (189 for STS-1-Xv and 585 for STS-3c-Xv) and is automatically set based on provisioning |
| PTR_IN | is incoming pointer within a payload envelop (0 – SPE_SIZE-1); is reset to 0 at J1 and is incremented after each valid data word is enqueued |

The per-channel data structure is as follows:

| | |
|---|---|
| MFI_OUT: | is the outgoing MFI (0-4095); is reset to 0 and is updated by the alignment logic |
| PTR_OUT: | is the outgoing pointer within a payload envelop (0 – SPE_SIZE-1); is reset to 0 initially and at frame boundary, and incremented after all the constituent timeslots have successfully dequeued a data word (indicated by VALID remaining at 1) |
| VALID | data valid flag; is reset to 1 at the beginning of a copy cycle and is reset to 0 when a constituent timeslot does not have valid data for output (i.e., queue is empty) |

The alignment logic maintains a queue for each constituent time-slot. The write and read pointers of each queue respectively identify the memory location in which a 32-bit word is written or read from. The write pointer is calculated using the following equations during every cycle in which a valid data is passed to the alignment logic 106 by matrix transposer 104. While the MFI_IN specifies the coarse location (i.e. which frame), the pointer PTR_IN specifies the fine offset of a data word within a frame.

$$MFI\_IN\_IDX' = (MFI\_IN\_IDX + MFI\_IN' - MFI\_IN) \bmod MAX\_MFI$$

$$WR\_PTR = MFI\_IN\_IDX' \times SPE\_SIZE + PTR\_IN + INIT\_PTR$$

In the above equations, MFI_IN' is the new incoming MFI extracted by extractor 108 (as described above). MFI_IN is replaced with MFI_IN' after MFI_IN is used in the calculation of the write pointer, shown above. MFI_IN_IDX' is the index of the new incoming MFI. MFI_IN_IDX is replaced with MFI_IN_IDX' after MFI_IN_IDX is used in calculation of the write pointer, shown above. If the queue size MAX_MFI is limited to certain values (e.g. power of two), then the modulo operation can be simplified. Signal MFI_IN_IDX is used because with arbitrary queue size and MFI aliasing, the same MFI_IN may be mapped to different locations, e.g. both 0 and 4096 are aliased to 0 when represented with 12 bits, but (0 mod 3)=0, and (4096 mod 3)=1.

Figure 6:
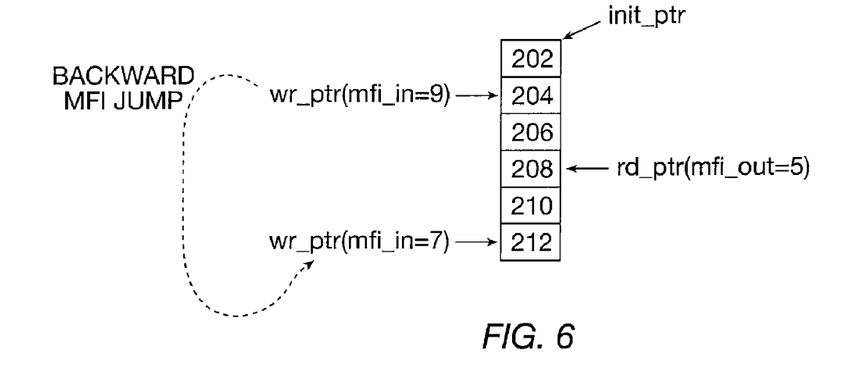
FIG. 6 shows adjustments of a write pointer of the alignment logic during MFI backward jump.

During normal operations, MFI increments sequentially, therefore, the write pointer WR_PTR also increments sequentially. The write pointer WR_PTR wraps around to INIT_PTR once it reaches the boundary of the allocated space. However, when a channel is reprovisioned, the MFI may jump in either direction. When there is an MFI jump, MFI_IN_IDX and WR_PTR are adjusted at the beginning of a frame when signal MT_SOF associated with that frame arrives. By changing the queue size MAX_MFI, alignment logic 106 can tolerate differential delays of up to MAX_MFI frames. FIG. 6 shows one queue in the alignment logic's RAM and its associated read and write pointers before and after a backward MFI jump. The queue size MAX_MFI is set to 6, which means that it can tolerate up to 6-frame differential delay. Because MFI_OUT is 5, as long as MFI_IN is in the rage of 5-11, the MFI jump can be handled by the queue without resynchronization. Before the MFI jump, the write pointer is pointing to frame 204 corresponding to MFI_IN of 9. Next, a new incoming MFI, i.e., MFI_IN of 7 is received. Accordingly, the write pointer is moved back two queues, i.e., from queue 204 to queue 212—after wrapping around from queue 202 to queue 212. After the backward jump, the differential delay becomes 6-5=1.

The read pointer is calculated using the following equation and during every cycle:

$$RD\_PTR=MFI\_OUT\_IDX \times SPE\_SIZE+PTR\_OUT+INIT\_PTR$$

Additionally, when PTR_OUT rolls back to 0 (i.e. when it crosses a frame boundary), MFI_OUT_IDX is updated using the following:

$$MFI\_OUT\_IDX'=(MFI\_OUT\_IDX=MAX\_MFI-1) ?0:(MFI\_OUT\_IDX+1)$$

For the read side, since the data has already been aligned when it is written, MFI_OUT_IDX is incremented sequentially. To compensate for differential delays, fast time-slots must wait until slow timeslots arrive; this is accomplished by pausing the increment of PTR_OUT until all the time-slots have output their associated data. Because of overhead and fixed stuff bytes, the RAM fill rate is often slower than its drain rate, so a queue may be empty when it is being read. This slows down all the constituent time-slots, thereby achieving synchronization.

The per-channel VALID flag is used to ensure that all the constituent time-slots have valid output data. This flag is reset to 1 at the beginning of a copy cycle, described further below. For STS-N traffic, the copy machine, disposed in marriage network 140 (see FIG. 2), has an operating period of N cycles. During each such N cycles, the copy machine loads one bank of the input RAM (disposed in marriage network 140 as shown in FIG. 2), moves data from the other bank of the input RAM to one bank of the output RAM (disposed in marriage network 140 as shown in FIG. 2), and outputs data from the other bank of the output RAM. During a copy cycle, all the queues in the alignment logic's RAM are read in a round-robin fashion. When a queue is empty, the per-channel VALID flag corresponding to the channel is set to 0. Thereafter, at the end of the copy cycle or at the beginning of next copy cycle, the per-channel VALID flag is checked. The per-channel PTR_OUT is increment if and only if the per-channel VALID flag remains at 1. The valid flags are also passed to the copy machine, so the final data output can be qualified with correct valid indication.

The pointer adjustments described above enable the RVCP to tolerate MFI jumps up to the programmed queue size. When an MFI jump is detected, the RVCP may either force itself out of synchronization and then regain it, or keep outputting corrupted data. In either case, resynchronization is attained after an amount of time that is less than that associated with MAX_MFI frames elapse.

Synchronization of Constituent Time-Slots

As described above, the alignment logic aligns the data at the write side, i.e., writes data words into RAMs in such order that the same data when read sequentially arrive aligned at the output terminals of the alignment logic. However, no data is read from the alignment logic's RAM until all the constituent time-slots have received frames with the same MFI. Alignment logic 106 performs synchronization, thereby enabling the readout of the data from the memory.

Figure 7:
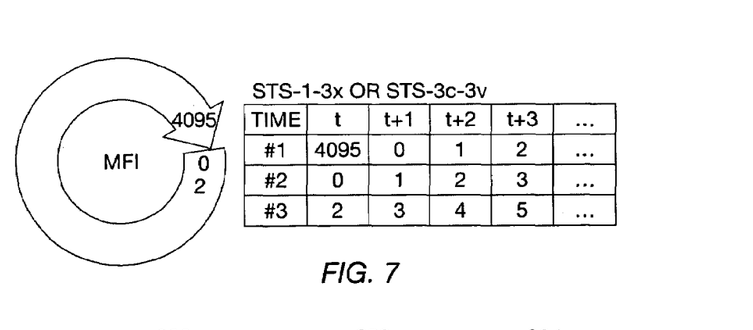
FIG. 7 shows the effect of aliasing on the MFIs associated with three time slots.

As is known, a MFI is a number which specifies the frame index. All the constituent timeslots originate with the same MFI at the transmit end, but after different delay paths, they may carry different MFIs at the receive end. In other words, as these different time-slots travel through different paths with different delays, data belonging to different time-slots may arrive at the receiving end with different MFIs. A faster time-slot, i.e., one which goes through a path with shorter delay, typically arrives at the receiving end with an MFI that is larger than a slower time-slot, i.e., which goes through a path with longer delay. Ideally, synchronization may be done after all the constituent time-slots have received a full MFI at which time the outgoing MFI, i.e., MFI_OUT, is set to the maximum MFI value (which corresponds to the fastest timeslot) for all the constituent time-slots. Thereafter, one must wait for that maximum MFI value to appear in all the constituent time-slots. However, due to aliasing problems, which are caused by representing an MFI using 12 bits, it is difficult to find the true maximum MFI. FIG. 7 shows three constituent timeslots, namely 1, 2 and 3 that respectively receive MFIs of 4095, 0 (aliased from 4096), and 2 (aliased from 4098). Even though time-slot number 3 has the highest true MFI (i.e., 4098) prior to aliasing, time-slot number 1 has the highest MFI after aliasing. Accordingly, because of aliasing, it is difficult to find the true maximum MFI. Another method for synchronization is to wait for a particular MFI value (e.g. 0) to appear in all the constituent timeslots. However, this method is slow as it may require up to 0.5 s (i.e., 4096×125 μs) in the worst case before data is output.

In accordance with the present invention, to perform synchronization of constituent time-slots the following steps are taken. First, the alignment logic waits until the constituent time-slots all receive a full MFI (as described before, this may require up to 16 frames). Next, when the first queue entry is accessed, i.e., when MFI_IN_IDX is set to 0, alignment logic 106 stores the MFIs. Next, alignment logic 106 waits until all the constituent time-slots have the same stored MFI. Next, alignment logic 106 sets MFI_OUT to the same stored MFI value and sets PTR_OUT to 0. Next, alignment logic 106 starts reading data out of each constituent time-slot.

The above synchronization method is done for each channel independently in a time-slot-multiplexed fashion. Furthermore, if the queue sizes are set to different values to match the differential delays (i.e., larger MAX_MFI for faster timeslots), then a common MFI value is guaranteed to appear in all the constituent timeslots within the Least Common Multiple (LCM) of all the queue sizes.

Figure 8:
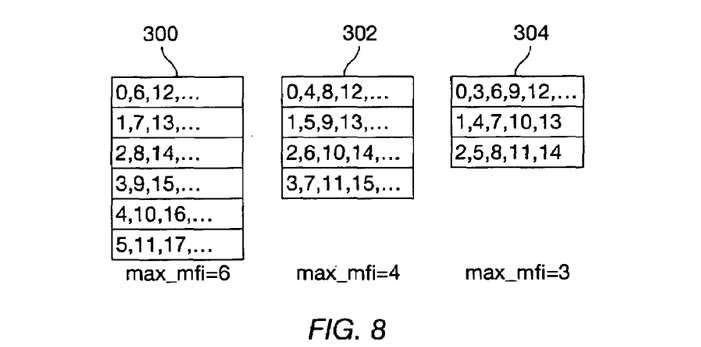
FIG. 8 shows a number of logical queues disposed in the RAM associated with the alignment logic and each having a different size.

FIG. 8 shows three queues 300, 302 and 304 corresponding to three constituent time-slots of a virtually concatenated channel. Queue 300 has a size (i.e. MAX_MFI) of 6, queue 302 has a size of 4 and queue 304 has a size of 3. The numbers in each queue entry represent the MFIs received. The LCM for the three queue sizes is 12, therefore for these three queues synchronization occurs within 12 frames. As can be seen in FIG. 8, no matter what the current MFI is for each queue, the three queues are guaranteed to have the same stored MFI within 12 frames. If the queue size for all the constituent time-slots is set to the same value, then the LCM is the same as the queue size.

Hitless Re-Provisioning

Hitless re-provisioning refers to changing of the channel mapping without losing any data. In accordance with the present invention, the RVCP is adapted to switch provisioning without losing any data on unaffected channels. To achieve this, each of calendar 118 (see FIG. 2), schedule RAM 120, MFI&SQ extractor 108 (in the provision database and only for virtual concatenation), and the channel IDs as defined in provision database 110 are double buffered.

The above embodiments of the present invention are illustrative and not limitative. For example, the invention is not limited by the number or type of channels that are concatenated. Nor is the invention limited to the type of traffic flowing through the channels. The invention is not limited by the type of hardware or software adapted to perform the above inventions. Furthermore, it is understood that the above inventions may be performed by either software modules, hardware modules or a combination of both. Other variations, modifications, additions, deletions, and equivalents will be apparent to a person skilled in the art and are intended to fall within the scope of the appended claims.

What is claimed is:

1. A method comprising:
    receiving a SONET frame carrying time-slot interleaved payload segments associated with N time-slots of concatenated channels, wherein said concatenated channels include contiguously and virtually concatenated channels;
    extracting a multi-frame indicator for each of the N time-slots;
    converting the time-slot interleaved payload segments to per time-slot payload segments;
    storing each per time-slot payload segment in a memory location pointed to by a write pointer, said write pointer being defined by a multi-frame indicator and a sequence number associated with each time-slot;
    retrieving each per time-slot payload segment from its stored memory location and in accordance with a read pointer;
    outputting the per time-slot payload segments in accordance with the extracted multi-frame indicators to supply per-channel data;
    storing an expected sequence number associated with each time-slot in a first RAM; and
    storing a virtual channel number associated with each of the virtually concatenated channels in a second RAM; wherein each of the first and second RAMs are doubled buffered to enable hitless provisioning; wherein the contiguously concatenated channels are adapted to carry STS-Mc traffic to form STS-Mc-Nv traffic, wherein M is a multiple integer of three and greater than zero, and wherein N is an integer greater than zero.

2. The method of claim 1 wherein the aligning of the per time-slot payload segments is done during the storing and prior to retrieving the per time-slot payload segments.

3. The method of claim 2 wherein the alignment is done by adjusting the write pointer and in accordance with a multi-frame indicator.

4. The method of claim 3 wherein said retrieving is performed after all constituent time-slots have received frames having a same multi-frame indicator.

5. The method of claim 1 wherein said time-slot interleaved data are carried via SONET frames carrying STS-12N traffic, wherein N is a multiple integer of four.

6. The method of claim 1 further comprising:
    mapping each portion of data received from the virtually concatenated channels to a time-slot associated with STS-1 traffic to form STS-1-Mv traffic, where M is an integer greater than zero.

7. The method of claim 1 further comprising;
    mapping each portion of data received from the virtually concatenated channels to a time-slot associated with STS-3c traffic to form STS-3c-Mv traffic, where M is an integer greater than zero.

8. The method of claim 1 further comprising:
    mapping a first portion of data received from the virtually concatenated channels to a number of time-slots associated with STS-1 traffic to form STS-1-Mv traffic and further to map a second portion of data received from the virtually concatenated channels to a second number of time-slots associated with STS-3c traffic to form STS-3c-Ov traffic, wherein M and O each is an integer greater than zero.

9. The method of claim 6 wherein each time-slot interleaved payload segment is 32 bits.

10. The method of claim 1 further comprising:
    extracting each MFI using a 3-bit row counter.

11. The method of claim 1 further comprising:
    pre-incrementing each MFI after it is accumulated; and thereafter confirming each pre-incremented MFI.

12. The method of claim 1 wherein said extracting is carried out in parallel for a number of streams each carrying a subset of time-slot interleaved SONET data.

13. The method of claim 1 wherein the write pointer is adjusted relative to its previous position to overcome aliasing.

14. The method of claim 1 further comprising: storing one MFI for each time-slot to synchronize all time-slots associated with the same channel.

15. The method of claim 1 wherein said time-slot interleaved payload segments are received via a single data path.

16. A circuit comprising:
    a multi-frame extractor configured to receive a SONET frame carrying time-slot interleaved payload segments associated with N time-slots of concatenated channels; wherein said concatenated channels include contiguously and virtually concatenated channels said multi-frame extractor further configured to extract a multi-frame indicator for each of the N time-slots,
    an alignment logic having a write pointer, a read pointer and a memory; wherein said alignment logic is adapted to convert the time-slot interleaved payload segments to per time-slot payload segments, and to store each per time-slot payload segment in a memory location pointed to by the write pointer; said alignment logic being further adapted to retrieve each per time-slot payload segment from its stored memory location in accordance with the read pointer and to further align the per time-slot payload segments in accordance with the extracted multi-frame indicators to supply per-channel data, said write pointer being defined by a multi-frame indicator and a sequence number associated with each time-slot;
    a sequence RAM configured to store an expected sequence number associated with each time-slot; and
    a virtual channel number RAM configured to store a virtual channel number associated with each of the virtually concatenated channels; wherein each of the first and second RAMs are doubled buffered to enable hitless provisioning, wherein the contiguously concatenated channels are configured to carry STS-Mc traffic to form STS-Mc-Nv traffic, wherein M is a multiple integer of three and greater than zero, and wherein N is an integer greater than zero.

17. The circuit of claim 16 wherein the circuit aligns the per time-slot payload segments before it retrieves the payload segments.

18. The circuit of claim 17 wherein the circuit aligns the per time-slot payload segments by adjusting the write pointer and in accordance with a multi-frame indicator.

19. The circuit of claim 18 wherein the circuit retrieves the per time-slot payload segments after all constituent time-slots have received frames having a same multi-frame indicator.

20. The circuit of claim 16 wherein said time-slot interleaved data are carried via SONET frames carrying STS-12N traffic, wherein N is a multiple integer of four.

21. The circuit of claim 16 wherein said circuit is further adapted to map each portion of data received from the virtually concatenated channels to a time-slot associated with STS-1 traffic to form STS-1-Mv traffic, where M is an integer greater than zero.

22. The circuit of claim 16 wherein said circuit is further adapted to map each portion of data received from the virtually concatenated channels to a time-slot associated with STS-3c traffic to form STS-3c-Mv traffic, where M is an integer greater than zero.

23. The circuit of claim 16 wherein said circuit is further adapted to map a first portion of data received from the virtually concatenated channels to a number of time-slots associated with STS-1 traffic to form STS-1-Mv traffic and further to map a second portion of data received from the virtually concatenated channels to a second number of time-slot associated with STS-3c traffic to fonn STS-3c-Ov traffic, wherein M and O each is an integer greater than zero.

24. The circuit of claim 22 wherein each payload segment is 32 bits.

25. The circuit of claim 16 further comprising:
a 3-bit row counter adapted to extract each MFI.

26. The circuit of claim 16 further comprising:
an incrementer further adapted to pre-increment each accumulated MFI and to confirm each pre-incremented MFI.

27. The circuit of claim 16 wherein said circuit is further adapted to extract a multi-frame indicator in parallel for a number of streams each carrying payload segments of the SPE.

28. The circuit of claim 16 wherein the write pointer is adjusted relative to its previous position to overcome aliasing.

29. The circuit of claim 16, wherein the circuit is further adapted to store one MFI for each time-slot to synchronize all time-slots associated with the same channel.

30. The circuit of claim 16 wherein said time-slot interleaved payload segments are received via a single data path.

* * * * *